United States Patent [19]

Bernecki et al.

[11] Patent Number: 4,780,591

[45] Date of Patent: Oct. 25, 1988

[54] PLASMA GUN WITH ADJUSTABLE CATHODE

[75] Inventors: Thomas F. Bernecki, Elmont; Kevin J. Varley, Hicksville; William P. Rusch, Lake Ronkonkoma; Janusz Wlodarczyk, Jackson Heights; John F. Klein, Port Washington, all of N.Y.

[73] Assignee: The Perkin-Elmer Corporation, Norwalk, Conn.

[21] Appl. No.: 21,958

[22] Filed: Mar. 5, 1987

Related U.S. Application Data

[63] Continuation-in-part of Ser. No. 874,209, Jun. 13, 1986, abandoned.

[51] Int. Cl.[4] .......... B23K 9/00

[52] U.S. Cl. .......... 219/121.52; 219/124.03; 219/121.51; 219/121.5; 219/121.48; 313/231.51

[58] Field of Search .......... 219/124.02, 124.03, 219/121 PR, 121 PV, 121 PM, 121 PQ, 121 PP, 121 PT, 74, 75, 696; 313/231.31, 231.41, 231.51

[56] References Cited

U.S. PATENT DOCUMENTS

| | | | |
|---|---|---|---|
| Re. 25,088 | 11/1961 | Ducati et al. | 219/121 PR |
| 2,943,182 | 6/1960 | Prout et al. | 219/121 P |
| 3,242,305 | 3/1966 | Kane et al. | 219/121 PN |
| 3,318,793 | 5/1967 | Webb | 219/69 G |
| 3,513,281 | 5/1970 | Haase et al. | 219/121 P |
| 3,953,705 | 4/1976 | Painter | 219/121 P |
| 4,170,727 | 10/1979 | Wilkins | 219/124.03 |
| 4,531,043 | 7/1985 | Zverina et al. | 219/121 PP |
| 4,598,191 | 7/1986 | Mashic et al. | 219/121 PT |

*Primary Examiner*—M. H. Paschall

*Attorney, Agent, or Firm*—H. S. Ingham; F. L. Masselle; E. T. Grimes

[57] ABSTRACT

A plasma generating system comprises a plasma gun including a hollow cylindrical anode member, a hollow cylindrical intermediate member electrically isolated from and juxtaposed coaxially with the anode member to form a plasma-forming gas passage through the intermediate member and the anode member, and an axially movable cathode member. The intermediate member comprises tubular segments separated by resilient insulating spacing rings held in compression. Arc radiation is blocked from the spacer rings by meanders in the inter-segment slots and further by ceramic barrier rings. An electric motor or pneumatic piston responsive to a measurement of arc voltage continually adjusts the axial position of the cathode tip relative to the anode nozzle so as to maintain a predetermined arc voltage.

26 Claims, 5 Drawing Sheets

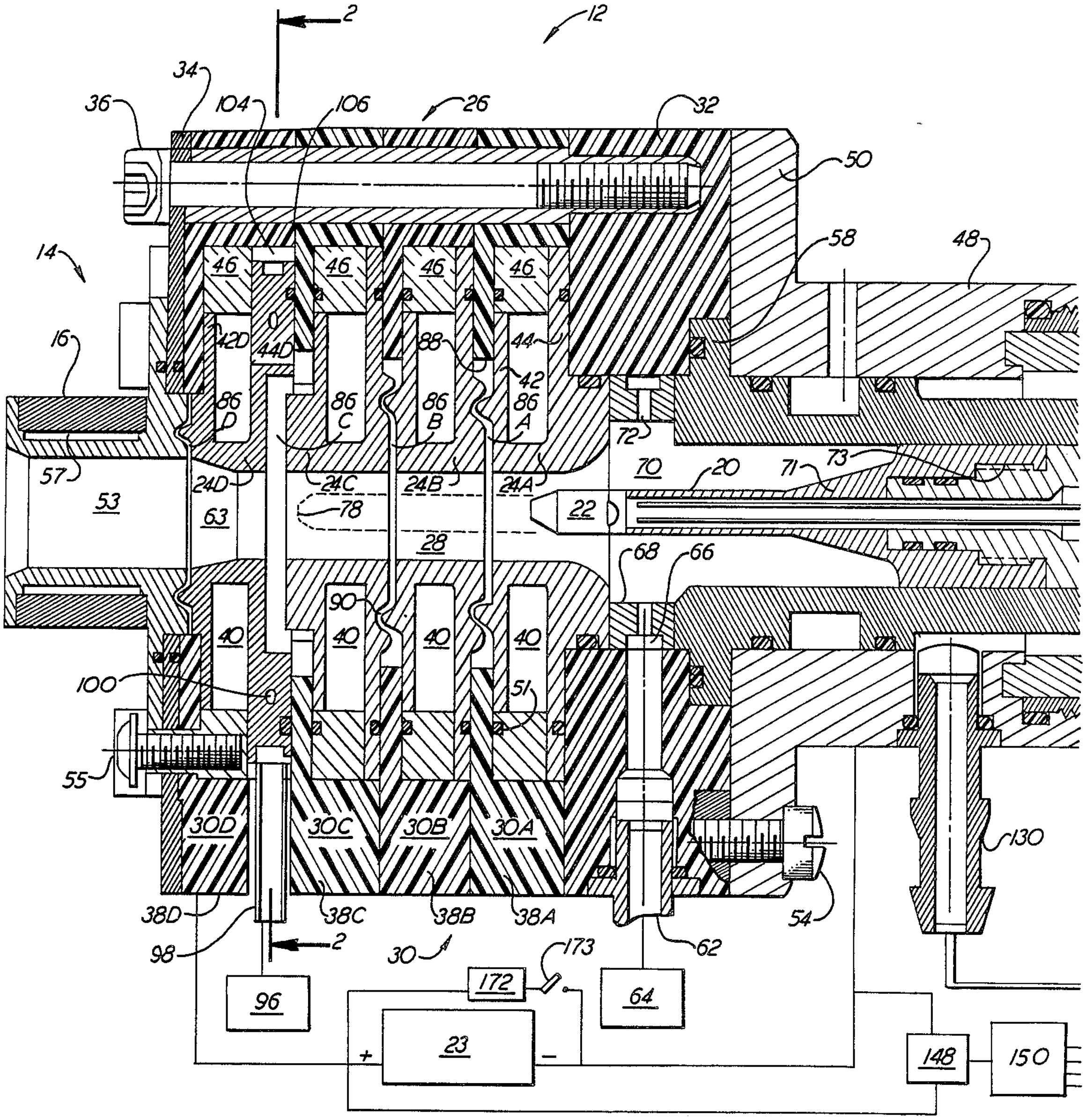
F/G. 1(a)
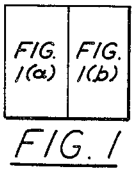
F/G. 1

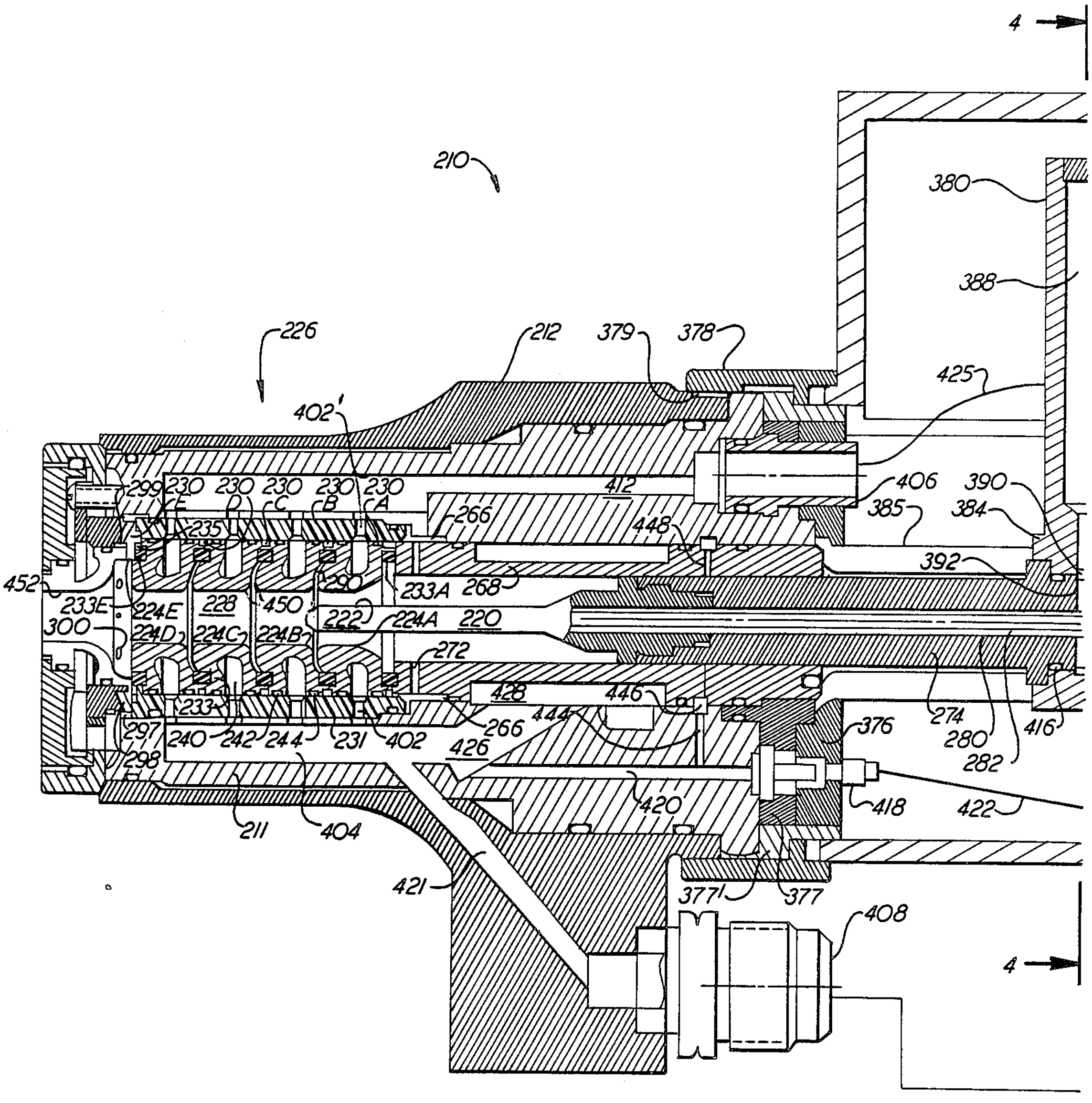
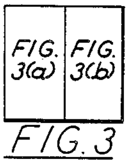
FIG. 3
FIG. 3(a)

PLASMA GUN WITH ADJUSTABLE CATHODE

This application is a continuation-in-part of U.S. patent application Ser. No. 874,209 filed June 13, 1986 now abandoned. This invention relates to a plasma gun including an axially adjustable cathode and to a method of adjusting the cathode to maintain a predetermined arc voltage for plasma generation.

BACKGROUND OF THE INVENTION

Plasma guns are utilized for such purposes as thermal spraying which involves the heat softening of a heat fusible material, such as a metal or ceramic, and propelling the softened material in particulate form against a surface to be coated. The heated particles strike the surface and bond thereto. The heat fusible material is typically supplied to the plasma spray gun in the form of powder that is generally below 100 mesh U.S. standard screen size to about 5 microns.

In typical plasma systems an electric arc is created between a water cooled nozzle (anode) and a centrally located cathode. An inert gas passes through the electric arc and is excited thereby to temperatures of up to 15,000 degrees Centigrade. The plasma of at least partially ionized gas issuing from the nozzle resembles an open oxy-acetylene flame.

U.S. Pat. No. 2,960,594 (Thorpe) discloses a basic type of plasma gun. FIG. 1 thereof shows a rod shaped cathode 28 and an anode nozzle 32. The cathode is located coaxially in spaced relationship with the anode nozzle operable to maintain a plasma generating arc between the cathode tip and the anode nozzle. Plasma-forming gas is introduced into an annular space 40 (Thorpe, FIG. 1) surrounding the cathode. This basic structure (without the adjustable cathode or interelectrode segments discussed below) is the type used commercially for such applications as plasma spraying.

Thorpe also depicts in FIG. 1 thereof the mounting of the cathode onto an electrode holder 3 which is threaded into the body of the gun so as to provide adjustment of the position of the cathode. As indicated at column 6, lines 17–24, initial striking of the arc is achieved by screwing the electrode body toward the nozzle and retracting it. An alternative method taught for starting the arc is by providing a high frequency source of current. After the arc is struck the same may be "suitably adjusted" by screwing electrode holder 3. It is also indicated that the tip of the electrode may be positioned at a distance away from the entrance of the nozzle. (Column 6, lines 64–66.) However, the "distance" is limited to relatively small variations, and there is no teaching or suggestion in Thorpe of what position of the cathode is suitable or how to determine such a position.

U.S. Pat. No. 3,627,965 (Zweig) similarly shows a plasma gun with a threaded cathode holder (FIG. 4) and suggests it may be used to alter the arcing gap. Zweig gives no further enlightenment as to the use of the threaded holder.

U.S. Pat. No. 3,242,305 (Kane et al.) discloses a retract starting torch in which starting of the arc is accomplished by a spring urging an electrode against the nozzle. Retraction to a fixed operating position is effected by the fluid pressure of the cooling water.

Zweig also teaches feeding powder inside the gun for spraying. It is well known in the art that such internal feed results in buildup of melted powder inside the nozzle bore. Therefore the conventional powder feeding method which avoids buildup is accomplished by feeding the powder into the flame near or outside the nozzle exit as illustrated in U.S. Pat. Nos. 3,145,287 (Siebein et al.) and 4,445,021 (Irons et al.). This location results in reduced uniformity and effectiveness in heating the powder.

A plurality of electrically isolated interelectrode segments is disclosed in U.S. Pat, No. 3,953,705 (Painter). With reference to the Painter figures these tubular segments are positioned between a nozzle assembly 8 and a rear, fixed electrode 12 of a tubular type, it being generally desirable to have the rear electrode serve as the anode. (Column 8, lines 47–57.) Starting is achieved by application of 20,000 volts which is further increased until the arc occurs. Thus the plasma gun of Painter is for a generally different mode of operation than that of the Thorpe type of plasma gun which has the nozzle as the anode and operates at up to only about 150 volts (Table III of Thorpe). In the low voltage mode the current is high, i.e. of the order of hundreds of amperes, and factors such as arc length and gas type and gas flow establish the operating arc voltage.

As indicated above and illustrated in the above-mentioned patents, the plasma-forming gas is generally introduced into the vicinity of the upstream electrode. Further gas may be injected at at least one point downstream such as is shown in Painter. Other references which show a construction for injecting a second flow of gas are U.S. Pat. Nos. Re. 25,088 (Ducati et al.) and 4,570,048 (Poole). Each of these references shows a fixed cathode.

Plasma guns generally are capable of operating on an inert gas such as argon or nitrogen as the primary plasma gas. For argon the gas is introduced into the chamber near the cathode through one or more orifices with a tangential component to cause a vortical flow to the plasma. The reason is that, without the vortex, the arc is not carried far enough down the nozzle, resulting in low voltage and low thermal efficiency. On the other hand, radial input is generally selected for nitrogen because a vortex tends to extend the nitrogen arc a long distance down the bore of the nozzle causing difficulty in starting the arc.

However, without a vortex for nitrogen, the voltage and efficiency are low. Therefore, an additive gas such as hydrogen is combined with the nitrogen, having the effect of improving these factors. When argon is used, even with a vortex, the efficiency is undesirably low. Hydrogen is again added where possible, but that gas is often considered undesirable as it may cause brittleness in the sprayed coating. Helium is an alternative additive gas but is expensive and less effective.

In view of the foregoing, an object of the present invention is to provide a novel plasma generating system and a novel method for maintaining a predetermined arc voltage without the use of an additive gas to the plasma-forming gas.

Another object is to provide an improved plasma spray gun including a novel powder injector.

A further object is to provide a novel metod for accurately controlling arc length and voltage at efficient levels in a plasma gun.

These and still further objects will become apparent from the following description read in conjunction with the drawings.

BRIEF DESCRIPTION OF THE INVENTION

The foregoing objects are achieved by a plasma-generating system which comprises a plasma gun that includes a hollow cylindrical anode member, a hollow cylindrical intermediate member electrically isolated from and juxtaposed coaxially with the anode member to form a plasma-forming gas passage through the intermediate member and the anode member, and an axially movable rod-shaped cathode member with an anterior cathode tip. The cathode member is located generally in the plasma-forming gas passage coaxially in spaced relationship with the anode member operable to maintain a plasma generating arc between the cathode tip and the anode member. The plasma generating system further comprises primary gas means including a primary gas inlet for introducing plasma-forming gas into the plasma-forming gas passage rearwardly of the cathode tip, a source of arc power connected between the anode nozzle and the cathode member, and positioning means for continually adjusting the axial position of the cathode tip relative to the anode nozzle so as to maintain a predetermined arc voltage.

In a preferred embodiment the intermediate member comprises a plurality of tubular segments and insulator assemblies for spacing the segments. The insulator assemblies include a plurality of resilient spacing rings held in compression in the gun. A ceramic barrier ring is juxtaposed loosely between adjacent segments radially inward of each spacer ring to block the spacing ring from radiation from the arc. The slots between adjacent segments have meanders therein to block arc radiation from impinging directly on the ceramic barrier ring.

DETAILED DESCRIPTION OF THE INVENTION

Figure 2:
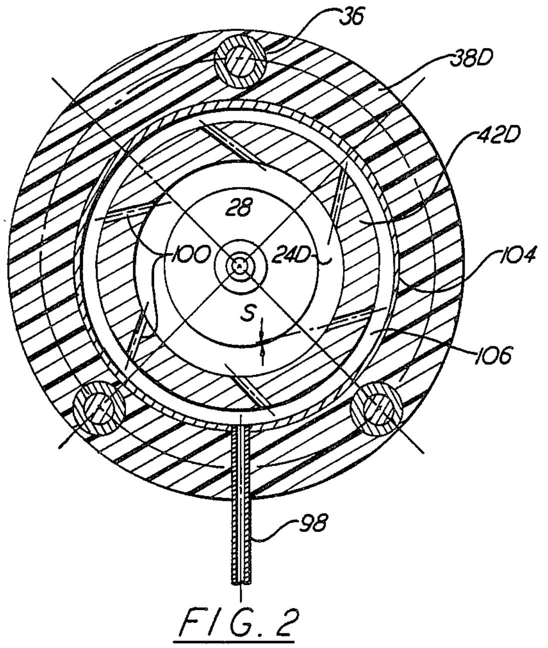
FIG. 2 is a transverse sectional view in the direction of the arrows along the line 2—2 in FIG. 1.

An embodiment of the present invention is illustrated in FIG. 1 which shows a plasma gun generally at 10. There are broadly three component assemblies, namely a gun body assembly 12, a nozzle assembly 14 including a tubular nozzle 16, and a cathode assembly 18. Gun body assembly 12 includes a generally tubular segment 24D adjacent the nozzle assembly, segment 24D constituting an anode. The cathode assembly includes a cathode member 20 that is located coaxially in spaced relationship with anode segment 24D such as to maintain a plasma generating arc between the cathode tip 22 and the anode in the presence of a stream of plasma-forming gas and a DC voltage. An arc power source is shown sceematically at 23. The anode and cathode are of conventional materials such as copper and tungsten respectively.

Gun body assembly 12 constitutes the central portion of the gun, excluding cathode member 20. Assembly 12 includes at least one, and preferably three, four or five generally tubular segments FIG. 1 shows three such segments 24A, 24B, 24C and similar anode segment 24D (designated collectively herein as 24) that are stacked to form assembly 12. Segments 24A, 24B, 24C define an intermediate member 26 which excluded anode 24D and contains the rear portion of a plasma-forming gas passage 28 extending therethrough for the arc and its associated plasma stream. (The letters A, B, C and D used with component numbers herein indicate, respectively, the rear, rear-central, forward-central and forward component. Also, as used herein and in the claims, the terms "anterior", "forward" and terms derived therefrom or synonymous or analogous thereto, have reference to the end from which the plasma flame issues from the gun; similarly "posterior", "rearward", etc., denote the opposite location.) Segments 24 are preferably made of copper or the like.

The segments 24 are electrically isolated from each other by respective dish shaped insulators 30A, 30B, 30C, each having a circular opening axially therein. The inner rim of each insulator is sandwiched between adjacent segments. An insulator 30D of similar shape fits on the forward end of anode segment 24D. The four stacked insulators form an insulating member 30. These plus a rear body member 32 and a forwardly located washer-shaped retainer 34 are held together with three bolts 36 (only one such bolt is shown in FIG. 1). The bolted outer rim portions 38A, 38B, 38C, 38D of insulators 30 thus establish the rigidity of the gun body.

For fluid cooling each of the segments 24 has an annular channel 40 therein formed by a forward rim 42 and a rear rim 44 bounding the annular channel in the middle of each segment. One such rim, i.e. the forward rim 42 in each segment in the present example, is of lesser diameter than the other rim 44. A containment ring 46 is brazed to the outer surface of the forward rim 42 and against the forward facing surface of the other rim 44, and fits inside of dish shaped insulators 30, thus enclosing annular channel 40 for coolant, typically water. O-ring seals 51 are appropriately placed between successive segment rims 42, 44, rings 46 and dish shaped insulators 30 to retain the coolant. Conventional connections (not shown) for supplying and removing coolant are made with annular channels 40.

Nozzle assembly 14 comprises nozzle 16 having a nozzle bore 53 therethrough and is held with three insulated screws 55 (one shown in FIG. 1) to retainer 34 on the forward part of gun body assembly 12. The nozzle bore is aligned coaxially with the rear portion 28 of the gas passage in the gun body assembly to form the full length of plasma-forming gas passage 28, 63, 63 from the rear body member through to the anterior exit of the nozzle bore. The nozzle, also made of copper or the like, is electrically isolated from gun assembly 12 including the stacked segments 24. This isolation is accomplished with forward dish-shaped insulator 30D.

Annular channeling 57 is provided in nozzle 16 for coolant. Coolant ducting in and out of the channeling as well as for the annular channels in the stacked segments is provided in any convenient and conventional manner (not shown).

The configuration and diameters of nozzle bore 53 are as known or desired for the purpose such as plasma spraying. In an embodiment described in detail below the bore is enlarged to contain a powder feeding assembly. The diameter of the connecting passage 63 in the forward (anode) segment 24D may diverge from the desired diameter of rear passage 28 in the other segments in order to match the diameter of nozzle bore 53.

Cathode assembly 18 including cathode member 20 is generally cylindrical, and the assembly is attached rearward of intermediate member 26 coaxially therewith. A mounting member 48 has a flange 50 which is held to the rear-facing surface of rear body member 32 by three circumferentially spaced screws (one shown at 54). Member 32 is formed of rigid insulating material such as machinable alumina. A tubular support member 56 is affixed within mounting member 48 and extends rearward therefrom. The forward part of support member 56 has a flange 58 which sets into a corresponding depression in the rear-facing surface of rear body member 32, thus positioning support member 56 coaxially within gun body assembly 12.

Rear body member 32 has a lateral gas duct 62 therein for receiving plasma forming gas from a source 64 of pressurized gas such as argon or nitrogen. The duct leads to an annular manifold 66 in the outer circumference of a gas distribution ring 68 situated around the perimeter of an annular gas inlet region 70 or plenum that constitutes the posterior end of plasma gas passage 28, 63, 53. Gas distribution ring 68 contains one or more gas inlet orifices 72 (two shown) leading from annular manifold 66 into inlet region 70. The orifices may be radial (as shown) as typically required for nitrogen gas, or may have a tangential component to form a vortical flow in passage 28, 63, 53 in the manner desired for argon gas. There may be a combination of radial and tangential orifices, and at least one orifice may have a forward axial slant. Alternatively, ring 68 may be formed of porous material so as to diffuse the gas into region 70. Gas distribution ring 68 is replaceable so that different plasma-forming gases or arc conditions may be chosen.

Returning to cathode assembly 18, cathode member 20 is shaped as a rod with anterior cathode tip 22 from which the arc extends forwardly to anode segment 24D. The cathode member is approximately the length of the portion of gas passage 28 that is enclosed by the three other segments 24A, 24B, 24C. The posterior (rearward) end of the cathode member may be formed as a tapered base 71 and is attached by threading 73 coaxially to the anterior (forward) end of a cathode support rod 74 slidably mounted in support member 56. Support rod 74 is free to move axially to locate cathode tip 22 within a range between a maximum extended position 78 (shown by dotted lines) near the posterior end of anode segment 24D and a maximum retracted position proximate the gas inlet chamber. It will be appreciated that the specific range will be as required for the operation that is described below. In FIG. 1 cathode tip 22 is set for a possible operating condition between the maxima.

Coolant for cathode member 20 is provided by coaxial channels in the conventional manner. An axial duct 8 extends from the rear of support rod 74 into cathode member 20 to a point near cathode tip 22. A long tube 82 is positioned axially in duct 80 forming duct 80 into an annular duct. Connecting pipes (not shown) for coolant flow in and out are made to tube 82 and duct 80.

As indicated in FIG. 1 respective annular slots 86A, 86B, 86C, 86D are formed between each adjacent pair of segments 24 and between anode segment 24D and nozzle 16, the slot being bounded outwardly by the inner surface 88 of each corresponding dish shaped insulator 30. An intense arc is generated in the passage 28, between cathode tip 22 and anode 24D. The slots, with a width preferably between about 0.5mm and 3mm, serve to isolate insulators 30 from the degrading effects of the radiation and heat from the arc and plasma. To further protect the insulators a radial meander 90 is formed in each such slot 86. This is achieved in the embodiment of FIG. 1 by having in each slot 86A, 86B, 86C an annular shoulder or ridge on the face of one segment encircling the continuous gas passage and a corresponding annular shoulder or depression in the surface of the facing segment. The ridge and depression create the radial meander 90 which inhibits arc radiation. A similar meander 90D is provided in slot 86D between forward segment 24D and nozzle 16. However, a different configuration for a slot 86C may exist between forward segment 24D and forward-central segment 24C as described immediately below.

In a preferred embodiment a second supply of plasma forming gas 96 is introduced into a lateral secondary gas duct 90 forward of the primary gas inlet at manifold 66. As depicted in FIG. 2 this secondary supply is preferably introduced through a plurality of tangential orifices 100 located in the rearward rim 42D of forward segment 24D. Most preferably tangential orifices 100 are oriented such that the extended axes of the orifices are substantially tangential to a coaxial circle of diameter equal to that of the bore of the anode segment 24D in the average location where the arc strikes the anode. For example, the nearest separation S (FIG. 2) between the axis and the circle should be less than about 10 percent of the diameter of the circle. That orientation was discovered to be most effective in rotating the arc root at the anode.

An annular groove in rearward rim 44D of segment 24D in conjunction with a close fitting ring 14 brazed to the rim 14D encloses a forward annular manifold 106 for the gas. Duct 98 connects between this manifold and external source 96 of secondary gas.

Typically the primary and secondary gas sources 64, 96 supply the same type of gas but they may have independent flow controls. It is also possible, where desired, to utilize different gases such as argon for the primary gas and nitrogen for the secondary gas.

For the operation of movable cathode member 20, support rod 74 may be moved axially by any known or desired method, including manually, but preferably by mechanical means such as pneumatically, or with an electrical motor.

In the embodiment of FIG. 1 support rod 74 is moved and positioned pneumatically. A piston 108 is affixed to the approximate axial midpoint of the support rod concentrically thereto. The piston slides axially within an elongated cylinder 110 that is threaded into the rear end of the mounting member 48. The available length of the cylinder is sufficient for the piston to carry the support rod and cathode the desired range of distance. The maximum extended position (forwardly; shown at 78 for the cathode) is established by support member 56 and a forward stop 112 which contact respectively a central flange 114 on support rod 74 and piston 108. The maximum retracted position (rearwardly) is established by a rear stop 116 which contacts piston 108, and by end piece 124 which contacts a bumper ring 117.

An anterior chamber 118 is formed in cylinder 110 between piston 108 and support member 56. A first pair of O-rings 120 in support member 56 seal the anterior chamber and provide a guide for support rod 74. A posterior chamber 122 is formed in the cylinder between he piston and end piece 124 screwed onto and closing the posterior end of the cylinder. The end piece slidingly engages the support rod with a second pair of O-rings 126 that seal the posterior chamber and further guide the support rod. A third pair of O-ring seals on the piston slide along the cylinder wall and provide pneumatic sealing between the chambers 118, 122. Further O-rings (not numbered) are strategically located to maintain pressurization of the chambers.

A forward gas pipe 130 communicates with anterior chamber 118, through mounting member 48, and a rear gas pipe 134 communicates with posterior chamber 22 through end piece 124. The forward and rear gas pipes are connected to a source Of pressurized gas 138, desirably compressed air, through first and second solenoid supply valves 140, 142 respectively. First and second solenoid venting valves 144, 146 are also connected to the forward and rear gas pipes respectively to provide selective venting of anterior and posterior chambers 118, 122 to atmosphere.

In operation, to move cathode member 20 rearwardly valve 140 is opened to allow compressed air to be forced into anterior chamber 118 and, simultaneously, valve 146 is opened to vent posterior chamber 122. To stop, valve 140 is closed. Similarly, to move cathode member 20 forwardly valve 1 is opened (with valve 146 closed) to enter compressed air into posterior chamber 1 and, simultaneously, valve 14 is opened to vent anterior chamber 118. Desirably the first supply and venting valves 140, 144 are combined mechanically or electrically (not shown), as are the second supply and venting valves 142, 146, such that posterior chamber 122 is automatically vented when the first valve 140 is closed and the anterior chamber 118 is automatically vented when the second valve 142 is closed.

Figure 3B:
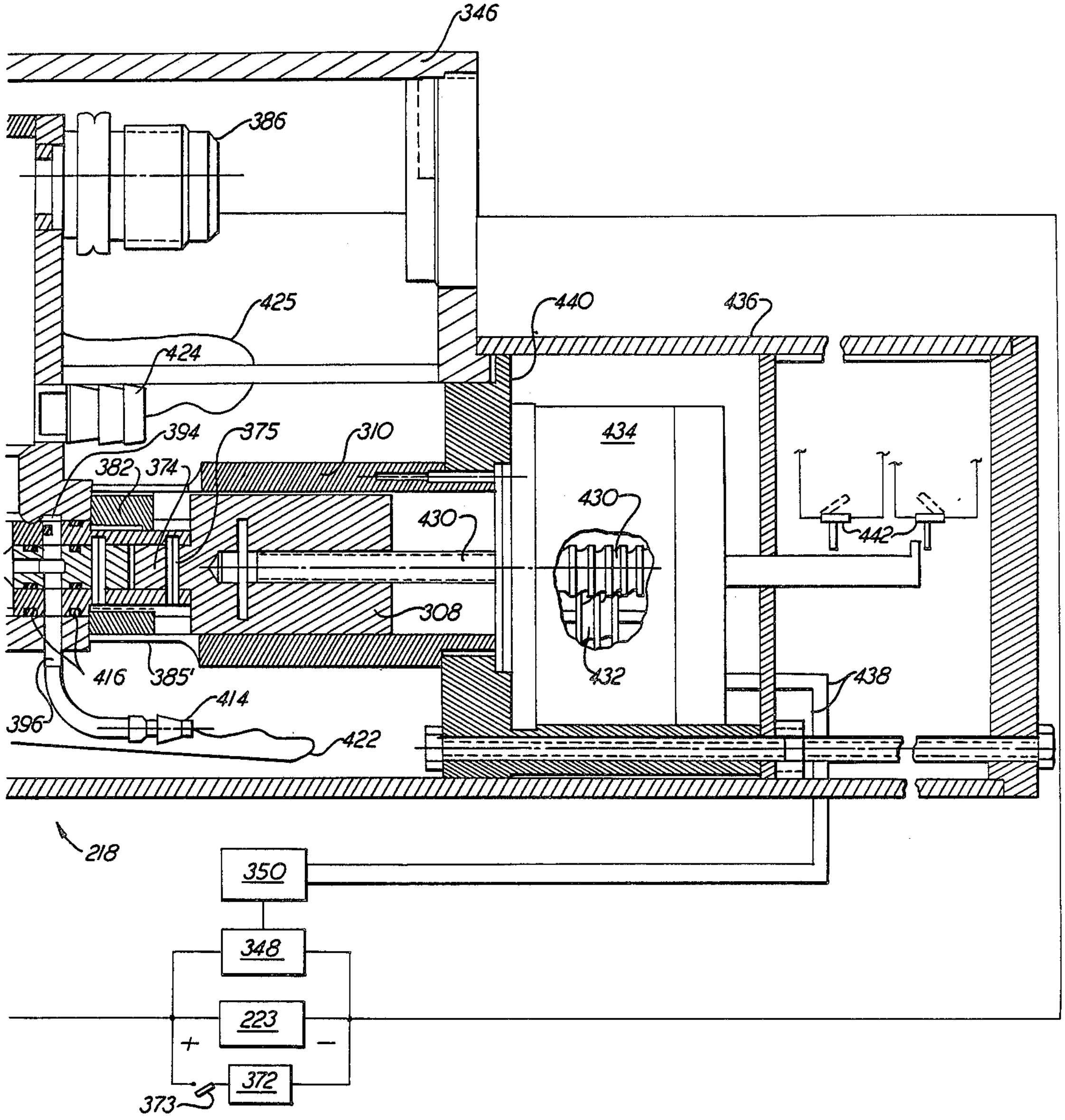
FIG. 3, comprising FIGS. 3(*a*) and 3(*b*), is a longitudinal sectional view of a plasma gun incorporating further embodiments of the present invention.

FIG. 3, comprising FIGS. 3(*a*) and 3(*b*), shows, a further embodiment of a plasma gun utilizing an electric motor and other features according to the present invention. Many of the features are quite similar to those of FIG. 1 as described above. Certain differences will become apparent from the following description.

An intermediate member 226 is formed of four tubular segments 224A, 224B, 224C, 224D which are stacked between insulating spacing rings 230B, 230C, 230D and closely fitted into an insulator tube 231 which is held in a metallic outer sleeve 211 which, in turn, is retained in a gun body 212. A similar ring 230A is engaged on the rearward side of rear segment 224A. The insulator tube is formed, for example, of glass filled Delrin$_{TM}$ The rims 242, 244 of segments 224 have O-ring seals (not numbered) in the circumference to seal annular channels 240 in segments 224 against insulator tube 231. Coolant to annular channels 240 is supplied through channeling in insulator tube 231, the channeling comprising a longitudinal duct 404 in outer sleeve 211 and a lateral duct 402 leading between duct 404 and each annular channel 240. Coolant is removed from channels 240 through a second set of lateral ducts 402′ diametrically opposite first ducts 402, thence through a second longitudinal duct 412 in sleeve 211 to a large hose fitting 406.

Spacing rings 230 are formed of a resilient material such as polyamide plastic and each is juxtaposed between adjacent segments 224 for spacing the segments. Each spacing ring is held in compression between segments. Thermal barrier rings 233 formed of a ceramic material such as boron nitride that is resistant to radiation of the arc are juxtaposed one each between each pair of adjacent segments radially inward of the corresponding spacing ring 230, which also supports the corresponding barrier ring 233. The barrier ring thus further protects the plastic spacing ring from the degrading effects of the radiation, in addition to a meander 290 in the corresponding slot (as described with respect to FIG. 1).

A spacing ring 230E of similar resilient material is held between forward segment 224E which, with the nozzle member, forms the anode structure, and adjacent segment 224D. Spacing ring 230E has a radially inward surface with a step 235 therein. A corresponding barrier ring 233E has a radially outward surface with a second step therein meshed with the first step. The purpose is to provide a path length along the meshing steps that is sufficient to resist electrical breakdown between the adjacent segments in the presence of the high frequency starting voltage. Also, it is desirable that each pair of rims 242, 244 be slightly unequal, for example 0.005 to 0.010 inches different, in diameter to prevent possible line-of-sight arcing.

Each barrier ring 233 has a width that is slightly but sufficiently less than the space in which the ring is situated between adjacent segments for freedom to float and compensate for unrestricted thermal expansion of the segments during operation of the plasma gun, without encountering stresses that may fracture the ring. Also the width is sufficiently large to block the spacing ring from radiation from the arc, preferably wider than the spacing rings 230 as shown in FIG. 3.

An anode nozzle 216 is held in the forward end of gun body 212 by a retainer ring 241 fastened to the front of the gun body with threading 243. As in the embodiment of FIG. 1, a nozzle bore 253 and a rear portion 228 of the gas passage through the stacked segments 224 form the plasma-forming gas passage. Arc current is conducted from anode 216 through forward segment 224E and gun body 212 to a conventional current connector 408.

Nozzle 216 has an annular coolant channel 410 therein, similar to those annular channels 240 in segments 224. An irregularly shaped portion 411 of segment 224E directs flow of coolant to the nozzle wall. Screws (one shown at 412) affix forward segment 224E and gun body 211 to outer sleeve 211. Coolant is fed to channel 410 from longitudinal duct 404 which communicates with a conventional connector 408 attached to gun body 212 for a coolant-carrying power cable which carries coolant as well as the anode current.

Continuing with FIG. 3, rearward of the stacked segments 224 an elongated gas distribution ring 268 is spaced axially from the rearward segment 224A by a barrier ring 233A that is similar to the other of rings 233 situated between segments. The forward part of distribution ring 268 has at least one gas inlet orifice 272 fed by a supply of gas via an annular manifold 266 and a laterally directed gas duct (not shown, the gas supply being similar to that in FIG. 1).

Similarly a second supply of plasma forming gas may be introduced through a passage (not shown) in outer sleeve 211 to an outer manifold 297 outward of forward segment 224D, thence through a plurality of outer orifices 298 in segment 224E to an inner manifold 299 that is adjacent nozzle 216, and inner orifices 300 in nozzle 216 for introducing the second gas into the forward part of gas passage 228 as described for FIG. 1.

A cathode assembly 218 of FIG. 3 includes a rod-shaped cathode member 220 which has an anterior tip 222 and is attached at its posterior end to a cathode support rod 274. The support rod is slidably mounted in elongated distribution ring 268 which serves as a support member to guide the support rod in its axial path.

At the rear end of support rod 274 a plastic cylinder 308 of such a material as Delrin$_{TM}$ is fitted by means of an axial protrusion 374 pressed into a hole in the end of support rod 274 and held with a pin 375. Plastic cylinder 308 rides in an elongated hollow cylinder 310 that is attached axially to the rear of gun body 212 by means of a retaining flange 376 that is held with a large retaining ring 378 onto body 212 with a threaded connection 379. Plastic cylinder 308 provides a self-lubricated guide in hollow cylinder 310 and support for the rear of support rod 274. Flange 376 also retains the components in the gun body including holding the spacing rings 230 between segments 224 in compression, in cooperation with forward segment 224E. Positioning rings 377, 377' aid in positioning components in body 212.

To provide an arc current connection for cathode member 220 and coolant to the gun, a connector block 380 is mounted on support rod 274 near its rear end. This is shown further in FIG. 4 which is a cross section of the gun taken at the location of block 380. Support rod 274 fits closely through a cylindrical aperture extending through the block.

A nut 382 threaded on the support rod between plastic cylinder 372 and block 380 holds the block against a contact flange 384 on support rod 274. The contact surfaces of the nut, flange and rod with the block provide an arc current path to the cathode. The block extends laterally from the support rod through a slot 385 in hollow cylinder 310 to where a second conventional connector 386 for a coolant-carrying power cable is made at the distal end of the block. A second slot 385' in cylinder 310 diametrically opposite the first also accommodates the block.

Lateral coolant duct 388 leads through the block from cable connector 386 to an annular duct 390 formed between support rod 274 and block 380. A short channel 392 leads to the cehter of support rod 274 where an axial duct 280 leads coolant to near the cathode tip 222. As in the embodiment of FIG. 1 a long tube 282 provides inlet and outlet channeling for the coolant.

A second annular duct 394 located between block 380 and support rod 274 connects axial duct 288 through a second short channel 396 to a small hose fitting 414. The two adjacent annular ducts 390, 394 are sealingly separated and enclosed by three O-rings 416. A second small hose fitting 418 is mounted in the rear of flange 376 and communicates through two fluid orifices 420, 421 with the anode power/coolant connector 408 on the gun body. A flexible hose (shown schematically at 422) attaches between the two small hose fittings 414, 418. Thus coolant for cathode 222 is tapped from the inlet at connector 408 through flexible hose 422 and into long tube 282 in the cathode support rod 274 and cathode member 220. Outlet coolant from the outside of tube 282 passes to lateral duct 388 and on to cable connector 286.

A second large hose fitting 424 extends rearwardly from block 380 and communicates forwardly with lateral duct 388. A large diameter flexible hose (shown schematically at 425) attaches between the first and second large hose fittings 406, 424 and passes coolant from nozzle 216 and segments 224 to block 380 and thus out through cable connector 386.

Coolant is also directed through ducts (partially shown) to an annular region 428 formed in the central portion of gas distribution ring to cool the ring.

Returning to connector block 380, being mounted rigidly on cathode support rod 274 it is moved axially therewith as the cathode member 220 is being positioned. The slots 385, 385' in cylinder 310 are elongated sufficiently to accommodate this movement.

Figure 4:
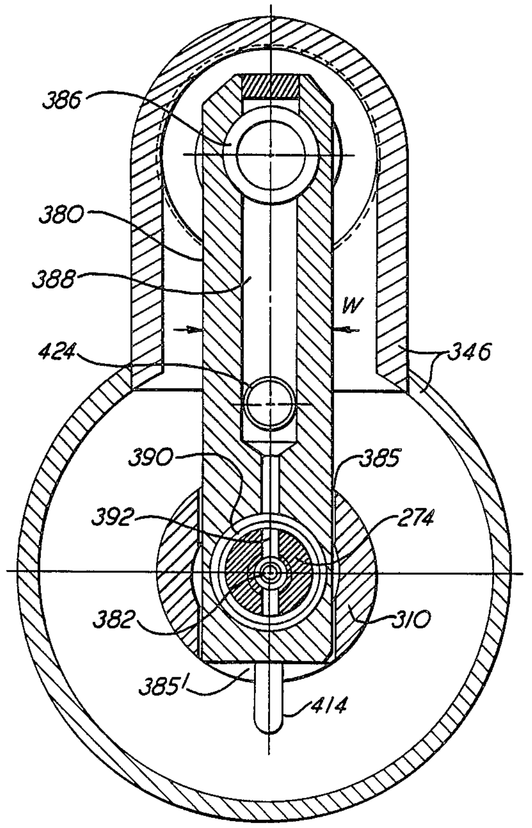
FIG. 4 is a transverse sectional view in the direction of the arrows along the line 4—4 in FIG. 3.

The width W of block 386 is slightly less than the inside diameter of cylinder 310 (FIG. 4). The slots 385, 385' are close fitting to the clock on both sides to prevent the block from rotating. The flexible hoses 422, 425 for coolant between fittings 406, 414, 418, 424 also accommodate to the movement.

Extending rearwardly and axially from a hole in plastic cylinder 308 is a worm gear member 430 which cooperates with a drive gear 432 associated with a conventional electrically driven linear actuator type of stepper motor 434 suitably mounted in a rear housing 436 of the gun. Other known or desired coupling means for a motor may be utilized. Current leads 438 to the motor selectively drive the motor in forward or reverse such as to move worm gear 430 axially and thus the entire cathode assembly forwardly or rearwardly. The current is provided in response to arc voltage measurement as described herein.

In FIG. 3 motor 434 is shown attached to a mounting ring 440 in housing 436 that also supports the posterior end of cylinder 310. It is further desirable to have conventional limit switches (shown schematically at 442) at the rear extremity of worm gear member (or other convenient loaation) to stop current to the motor to prevent overrun of the cathode assembly beyond predetermined maximum extremities of axial motion.

As previously indicated, the primary plasma-forming gas is introduced through the forward part of gas distribution ring 268, and the ring also provides a guide for cathode support rod 274. It is desirable to force gas between the support rod and the distributor in order to prevent blowback of hot gas and powder into the guide area. This is done with a bleed orifice 444 communicating with duct 426 to an annular opening 446 formed near the rearward end of distribution ring 268 and a plurality of inwardly directed orifices 448 leading through the ring.

Although intermediate member 26 or 226 (FIG. 1 or 3 respectively) may be formed of one piece, even of ceramic or the like, several metallic segments are preferred as described herein. It is important that the arc not short over to the intermediate member since uncontrolled arc length and voltage may ensue. Ceramic is feasible for the intermediate member or its segments but is difficult to cool and may deteriorate in the arc environment. Thus the segments are best produced from copper or the like. The purpose of the several segments is to create increased difficulty for the arc current to traverse the intermediate member to the anode nozzle.

The position of cathode tip 22 or 222 is chosen in correspondence with the desired predetermined voltage for the arc. The actual voltage is measured across the anode and cathode, or across the arc power supply 23 or 223, as shown schematically at 148 or 348 in FIG. 1 and FIG. 3 respectively. Generally a longer arc corresponds to a higher voltage which also yields a higher efficiency in thermal transfer of power to the plasma stream. (Thermal efficiency is generally determined by subtracting heat loss to the coolant, i.e. temperature rise times coolant flow rate, from the electrical power input, and taking the ratio of the difference to the power input.)

It is highly desirable, for process control purposes, to maintain a constant voltage. These results are achieved according to the present invention by determining the arc voltage and repositioning the cathode member as required to maintain the desired voltage. This is accomplished by moving the cathode member rearward with respect to the nozzle if the actual voltage is low, and forward if the voltage is high.

Preferably the positioning system, such as the solenoid valve control or the electrical motor, is electrically coupled to the voltage measuring system through a controller (shown schematically at 150 in FIG. 1 and 350 in FIG. 3) and is responsive to the voltage measurement such that a change in the arc voltage results in a corresponding change in the axial position of the cathode tip. This is readily achieved in controller 150 or 350 with a conventional or desired comparative circuit that provides the difference between the arc voltage and a preset voltage of the desired level. When the difference exceeds a specified differential an electronic relay circuit is closed to send an adjusting current for moving the support rod forward or rearward according to whether the voltage difference is positive or negative. The adjusting current is sent to the corresponding solenoid (FIG. 1), or to the appropriate winding of the motor (FIG. 3), as the case may be. The result will be minute (or, if necessary, large) cathode adjustments as any voltage changes take place, for example, from erosion of the anode and/or cathode surfaces.

Generally the longer arc contemplated for steady state operation under the present invention is difficult if not virtually impossible to initiate with application of the standard high frequency starting voltage. Therefore, according to a further embodiment of the invention, the cathode member is initially positioned in its extended position (dotted lines at 78 in FIG. 1 and a similar position in FIG. 3) near the anode nozzle. The desired operating gas flows and the arc voltage source 172 or 372 (FIG. 1 or 3) are turned on, although no current will flow yet. Then, when the high frequency starting voltage is momentarily applied in the normal manner (e.g., by closing switch 173 or 373 in FIG. 1 or 3), the arc will start and arc current will flow.

When the arc has been started (and high frequency switch 173 or 373 opened), the cathode is then retracted to its operating position, indicated approximately by its location in FIG. 1 and FIG. 3. By actuating the voltage comparison and responsive circuit, by means of an arc current detector in controller 150 or 350, the retraction will be automatic. Thus, when the arc initiates, the detector is turned on and will determine that the voltage is too low (due to the short arc) and will immediately signal the movement means to retract the cathode to an operating position corresponding to the preset voltage condition.

The arc current may either be preset so that the current assumes the desired value upon startup; or the current may be initially set at a low value and brought up after startup in the conventional manner or by electronic coordination with the voltage signal.

Figure 5:
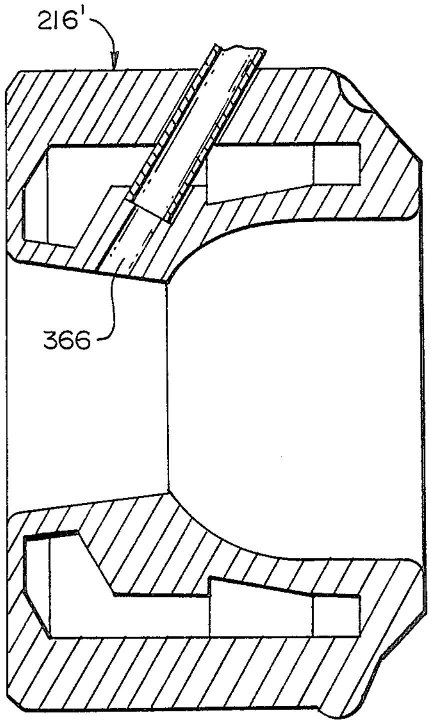
FIG. 5 is a longitudinal section of a nozzle with a powder injection port.

Power feeding into the plasma may be accomplished in the conventional manner as in aforementioned U.S. Pat. No. 4,445,021. However, the plasma gun according to the present invention is especially suited for internal feed in the nozzle, where the nozzle also is the anode, without the usual problem of buildup of powder adhering to the nozzle bore. This is apparently due to the controlled location of the arc root on the anode and to a wiping action of the secondary gas. FIG. 5 depicts a nozzle 216' that may be used in place of nozzle 216 in FIG. 3. A powder port 366 therein directs powder from a conventional powder source (not shown) well within the nozzle bore.

Figure 6:
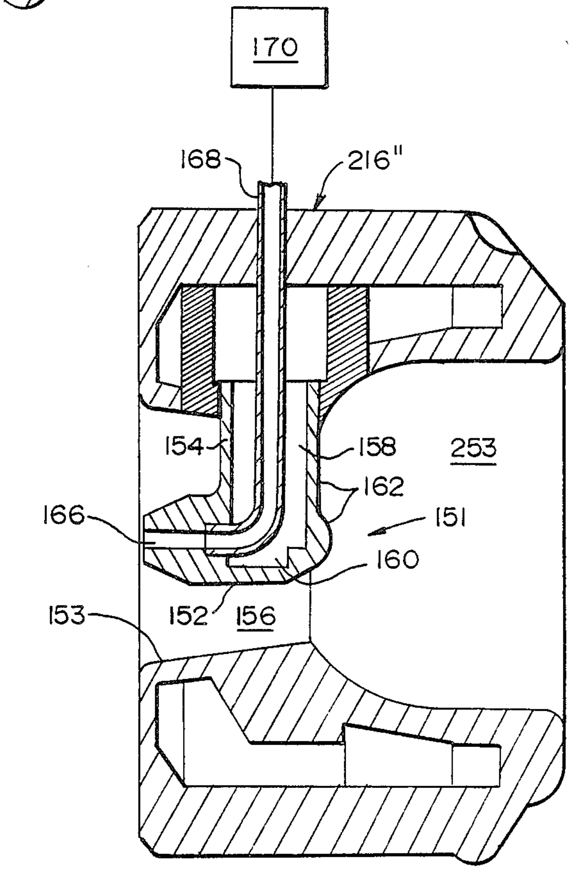
FIG. 6 is a longitudinal sectional view of a nozzle with a powder feeding assembly incorporating the present invention.

In a preferred embodiment, control of the arc position with the apparatus and method of the present invention allows for a powder feeding assembly to be placed in the nozzle bore. FIG. 6 shows a desirable feeding assembly 151 situated in nozzle 216'' which may be used in place of nozzle 16 or 216 in FIG. 1 or FIG. 3 respectively. An elongated cylindrical central member is positioned in the nozzle bore 253 which has an enlarged bore diameter to accommodate the assembly. A cylindrical central member 152 of assembly 151 is held in place with a mounting arm 154. The plasma flow path is provided in the annular space 156 between central member 152 and nozzle wall 153, the path being split by mounting arm 154.

It is particularly desirable that the anterior and posterior edges of the cylindrical inner surface of each segment be rounded in order to minimize splitting and jumping of the arc to the intermediate member. The radius of the rounded edges (450 in FIG. 3) of between about 1 mm and 3 mm is suitable. The radius of the posterior edge (452 in FIG. 3) of the anode should be between about 3 mm and 5 mm. These radii were found to be quite critical. The edge rounding of the anode apparently cooperates with the tangential flow of the secondary gas to provide the wiping effect to prevent powder buildup when using the powder injection structure shown in FIG. 5.

Coolant ducting 158 is provided in arm 154 and further ducting 160 in the central member for circulation of liquid coolant such as water, sufficient to prevent rapid deterioration of the assembly components in the presence of the plasma flow. At least the upstream edges 162 of the central member and the mounting arm should be gasdynamically rounded to minimize interference with, and cooling of, the plasma flow and erosion of the components.

Central member 152 has a powder port 166 opening forwardly into the center of the plasma stream. This port communicates with a powder duct 168 in the mounting arm, located coaxially in the coolant ducting. The powder duct is connected to a standard or desired type of powder feeder (shown schematically at 170) which supplies plasma powder in a carrier gas.

The apparatus of the present invention is operated generally with parameters of conventional plasma guns except voltage is maintained somewhat higher, a mode which is expected to provide increased thermal efficiency. Preferably the voltage is maintained at a set level between about 80 and 120 volts, the upper limit depending on power supply characteristics. For comparison the upper limit for a conventional gun is typically about 80 volts with an additive plasma gas in use. Current may be up to about 1000 amperes, although care should be taken not to exceed a power level that depends on factors such as coolant flows, for example 80 KW. Internal diameters are also conventional. Nozzle bores may be between about 3.8 mm and 12 mm radius. A suitable radius for gas passage 28 in the intermediate member is about 5 mm; and for electrode member 20 about 2.5 mm. A suitable range of travel for the cathode is about 50 mm.

Other variations of the present invention are possible. For example, the cathode may be held fixed relative to the gun body, and the assembly of the anode nezzle and the intermediate member may then be in sliding relationship to the gun body. In this arrangement, the gas distribution ring may be fixed with respect to the nozzle and slide therewith. It further may be desirable to fix the gas distribution ring with respect to the cathode member in order to maintain the gas introduction at an optimum point with respect to the cathode tip, even as the tip is moved. Thus, in a further embodiment (not shown in the drawings), the axial movement of the cathode assembly in the gun also carries a parallel movement of the gas distribution ring. It is also possible to utilize the motor driving mechanism of FIG. 3 with the forward part of the plasma gun construction of FIG. 1 and, conversely, the pneumatic device of FIG. 1 with the gun of FIG. 3.

The apparatus on method of the present invention provides for higher voltage operation than has proven practical in previous commercial plasma guns, especially those used for plasma spraying. The higher voltage increases the thermal efficiency of the system and allows higher power operation while minimizing the devastating effects of a high current arc on the electrode surfaces. The adjustability of the cathode according to voltage provides for choice of optimum voltage without the need for an additive gas and its attendant disadvantages. It also provides for continual and precision maintenance of a predetermined voltage, particularly with automated control based on voltage measurement. The present invention further allows for simple starting and automatic readjustment to the elevated condition, eliminating the difficulties of starting a high voltage arc. Yet other advantages of the system are evident in the foregoing description and further presented below.

It was further discovered, surprisingly, that a highly uniform plasma plume issues from the nozzle of the plasma gun of the present invention. This uniformity is an improvement over conventional plasma spray guns, such as the Metco Type 9MB sold by The Perkin-Elmer Corporation, Westbury, New York. The result is a significant improvement in repeatability of plasma spray coating properties. The uniformity is important for the application of gradated and sequential foating layers, and also of such materials as Metco 601NS plastic-metal powder blends, which are sensitive to uniformity of the plasma conditions.

Improved spray efficiencies were also discovered. For example, in spraying 601NS under similar conditions of powder and flow, the Type 9MB at ten pounds per hour spray rate yields a deposit efficiency of approximately 60%, while a gun according to FIG. 3 of the present invention yields a deposit efficiency of more than 80%. Additionally, at 20 pounds per hour, the Type 9MB produces virtually no coating while the present gun still yields more than 75% deposit efficiency.

When spraying at supersonic velocity, i.e. with a smaller diameter nozzle, quite distinct shock diamond patterns are visible, whereas with conventional guns the patterns are more diffuse. Clear shock patterns are desirable for choosing location of powder injection into the plasma stream.

The above described construction of the plasma gun according to the embodiment of FIG. 3 is highly desirable with respect to the combination of the segments, the resilient spacing rings held in compression, and the ceramic barrier rings. This construction was discovered to allow a practical assembly with insulating components sensitive to arc radiation and to fracture due to thermal expansion, under the severe conditions of the plasma and arc.

While the invention has been described above in detail with reference to specific embodiments, various changes and modifications which fall within the spirit orf the invention and scope of the appended claims will become apparent to those skilled in this art. The invention is therefore only intended to be limited by the appended claims or their equivalents.

What is claimed is:

1. A gas stabilized plasma generating system characterized by precision controlling of plasma conditions, comprising:

a plasma gun including a hollow cylindrical anode member, a generally tubular intermediate member formed of electrically conducting material electrically isolated from and juxtaposed coaxially with the anode member to form a plasma-forming gas passage through the intermediate member and the anode member, and an axially movable rod-shaped cathode member with an anterior cathode tip located coaxially in spaced relationship with the anode member operable to maintain a plasma generating arc in plasma-forming gas between the cathode tip and the anode member to produce a plasma stream, the cathode member being located generally in the plasma-forming gas passage such that the cathode tip is movable coaxially within the intermediate member, primary gas means including a primary gas inlet for introducing plasma-forming gas into the plasma-forming gas passage rearwardly of the cathode tip;

secondary gas means for introducing plasma-forming gas into the plasma-forming gas passage at a location proximate the anode member;

means for connecting a source of arc power between the anode member and the cathode member; voltage determining means for measuring the arc voltage between the cathode member and the anode member; and positioning means for continually adjusting the axial position of the cathode tip relative to the anode member so as to maintain a predetermined arc voltage;

wherein the intermediate member is formed of a plurality of electrically conductive tubular segments and insulating means for spacing the segments, the segments being juxtaposed coaxially and held electrically isolated from each other by the insulating means, and the intermediate member being formed substantially with an absence or additional gas introduction into the plasma-forming gas passage.

2. A plasma generating system according to claim 1 wherein a forward annular chamber is formed between the intermediate member and the anode member, and the secondary gas means introduces plasma-forming gas with a vortical flow at the circumference of the forward annular chamber.

3. A plasma generating system according to claim 2 wherein the secondary gas means includes a plurality of tangential orifices having axes substantially tangential to a circle of diameter equal to that of the bore of the anode member at the average location where the arc strikes the anode member.

4. A plasma generating system according to claim 1 wherein the positioning means includes means for positioning the cathode tip sufficiently close to the anode member for the arc to be initiated in the presence of a high frequency starting voltage, and further includes means for retracting the cathode member after arc initiation to position the cathode tip relative to the anode member so as to establish the pre-determined arc voltage.

5. A plasma generating system according to Claim 1 wherein the plasma gun further includes a forward segment comprising the anode member and the insulating means comprises a plurality of insulating rings, one such ring being interposed between each pair of adjacent segments and an annular slot being formed between the adjacent segments, each slot being bounded outwardly by the corresponding insulating ring.

6. A plasma generating system according to Claim 5 wherein the width of the slot between segments is between about 0.5 mm and 3 mm.

7. A plasma generating system according to claim 5 wherein, in each of said slots formed between adjacent segments, one such segment has an annular shoulder thereon encircling the continuous gas passage and the adjacent segment has a corresponding shoulder depression therein cooperating with the annular shoulder to form a radial meander in the slot such that arc radiation is blocked from impinging directly on the corresponding insulating ring.

8. A plasma generating system according to claim 1 wherein the segments are three, four or five in number.

9. A plasma generating system according to claim 1 wherein each segment has a cylindrical inner surface with a posterior edge and an anterior edge rounded with a radius between about 1 mm and 3 mm, and the anode member has a posterior bore edge rounded with a radius between about 3 mm and 5 mm.

10. A plasma generating system according to Claim 1 wherein:

the plasma gun further includes a forward segment comprising the anode member, and includes retaining means for retaining the segments and the insulating means in coaxial relationship;

the insulating means comprises a plurality of resilient spacing means, each spacing means being juxtaposed between adjacent segments for spacing the segments, the spacing means being held in compression by the retaining means; and the insulating means further comprises a plurality of ceramic barrier rings each being juxtaposed between adjacent segments radially inward of a corresponding spacing means.

11. A plasma generating system according to Claim 10 wherein each spacing means comprises a spacing ring formed of resilient material supporting the barrier ring.

12. A plasma generating system according to claim 11 wherein the spacing ring adjacent the forward segment has a radially inward surface with a first step therein, and the corresponding barrier ring has a radially outward surface with a second step therein meshed with the first step so as to provide a path length sufficient to resist electrical breakdown between the adjacent segments in the presence of a high frequency starting voltage.

13. A plasma generating system according to claim 10 wherein an annular slot is formed between the adjacent segments, each slot being bounded outwardly by the corresponding barrier ring.

14. A plasma generating system according to Claim 10 wherein a space is formed between adjacent segments with the barrier ring having a width sufficiently less than the space to compensate for thermal expansion of the segments and sufficiently large to block the spacing means from radiation from the arc.

15. A plasma generating system accordrng to Claim 1 wherein the positioning means is electrically connected to the voltage determining means and responsive thereto such that a change in the aro voltage is detected by the volt-age determining means and the axial position of the cathode tip is correspondingly adjusted to maintain the predetermined arc voltage.

16. A plasma generating system according to Claim 15 wherein the plasma gun further comprises a support rod having an anterior end with the cathode member attached coaxially thereto and a rearwardly located tubular support member with the support rod slidably mounted therein, and the positioning means includes drive means for providing axial movement of the support rod in the support member.

17. A plasma generating system according to Claim 16 wherein the drive means comprises a reversible electric mctor coupled to actuate the support rod in axial movement.

18. A plasma generating system according to Claim 16 wherein the plasma gun further comprises a closed cylinder extending rearwardly from the support member, and a piston attached concentrically to the support rod and slidably positioned in the closed cylinder thereby forming in the cylinder an anterior chamber and a posterior chamber, and fluid sealing means interposed between the piston and the cylinder, and the plasma system further comprises anterior supply means for supplying fluid under pressure to the anterior chamber and posterior supply means for supplying fluid under pressure to the posterior chamber, such that selective supply of fluid to the anterior chamber or the posterior chamber provides adjustment of the axial position of the cathode tip relative to the anode member.

19. A plasma generating system according to Claim 18 wherein the anterior supply means comprises a pressurized fluid source and a first supply valve connected between the fluid source and the anterior chamber, the posterior supply means comprises the fluid source and a second supply valve connected between the fluid source and the posterior chamber, and the plasma system further comprises a first venting valve connected to the anterior chamber and a second venting valve connected to the posterior chamber, the first and second venting valves being respectively cooperative with the second and first supply valves such that the first venting valve is open to release fliid from the anterior chamber when the second supply valve is open to pass pressurized fluid into the posterior chamber and the second venting valve is open to release fluid from the posterior chamber when the first supply valve is open to pass pressurized fluid into the anterior chamber, the first and second supply valve further being electrically connected to the voltage determining means and responsive thereto such that a change in the arc voltage is detected by the voltage determining means and the first or second supply valve is opened such as to adjust the axial position of the cathode tip to maintain the predetermined arc voltage.

20. A plasma generating system according to claim 1 further comprising a nozzle member and powder feeding means therein for introducing powder into the plasma generated by the arc.

21. A plasma generating system according to claim 20 wherein the nozzle member has an inner wall forming a nozzle bore portion of the continuous gas passage, and the powder feeding means includes a feeding assembly mounted in the nozzle bore, the feeding assembly comprising a cylindrical central member and a mounting arm attached between the central member and the nozzle wall to hold the central member substantially in the axial center of the nozzle bore forming an annular flow path for the plasma between the central member and the nozzle wall, the central member and the mounting arm each having a coolant duct therein for circulating liquid coolant sufficiently to prevent rapid deterioration of the central member and the mounting arm in the presence of the plasma, the central member further having an axial powder port therein for introducing powder forwardly into the plasma, and the mounting arm further having a powder duct therein connected to the powder port for conveying powder to the powder port.

22. A plasma generating system according to claim 20 wherein the anode member comprises the nozzle member, and the nozzle member has therein a radially directed powder feed port for injecting powder into the gas passage, the nozzle bore portion having a posterior bore edge rounded with a radius between about 3 mm and 5 mm.

23. A plasma generating system characterized by precision controlling of plasma conditions, comprising:

a plasma gun including:

a hollow cylindrical anode member;

a hollow cylindrical intermediate member electrically isolated from and juxtaposed coaxially with the anode member to form a plasma-forming gas passage through the intermediate member and the anode member, the intermediate member comprising a plurality of electrically conductive segments including a forward segment adjacent the anode member, and further comprising insulating means for spacing the segments, the segments being juxtaposed coaxially and held electrically isolated from each other and the anode member by the insulating means, an annular slot being formed between the adjacent segments and between the forward egment and the anode member, the slot being bounded outwardly by the insulating means, and each slot having a radial meander therein such that arc radiation is inhibited form impinging on the insulating means;

an axially movable rod-shaped cathode member with an anterior cathode tip, the cathode member being located generally in the plasma-forming gas passage coaxially in spaced relationship with the anode nozzle operable to maintain a plasma generating arc between the cathode tip and the anode member;

a cylindrical rear body member positioned rearwardly adjacent the intermediate member and having a cylindrical cavity therein forming an annular manifold axiallay adjacent the posterior end of the continuous gas passage, the rear body member including a primary gas inlet for introducing plasma-forming gas into the annular manifold;

a secondary gas means for introducing plasma-folding gas into the plasma-forming gas passage at a location between the primary gas inlet and the anode member, including a forward annular chamber in the intermediate member of substantially larger diameter than that of the continuous passage and a plurality of tangential orifices in the intermediate member for introducing plasma-forming gas with a vortical flow at the circumference of the forward annular region;

a tubular support member mounted rearwardly adjacent the rear body member; and a support rod slidably mounted in the tubular support member and having an anterior end with the cathode member attached coaxially thereto, with a drive means coupled to actuate the support rod in axial movement;

the plasma generating system further comprising;

primary gas means including a primary gas inlet for introducing plasma-forming gas into the plasma-forming gas passage rearwardly of the cathode tip;

a source of arc power connected between the anode member and the cathode member; and voltage determining means for measuring the arc voltage between the cathode member and the anode member, the drive means being electrically connected to the voltage determining means and responsive thereto such that a change in the arc voltage is detected by the voltage determining means and the axial position of the cathode tip is correspondingly adjusted to maintain the predetermined arc voltage;

wherein the intermediate member is formed substantially with an absence of additional gas introduction into the plasma-forming gas passage.

24. A plasma generating system according to claim 23 wherein:

the plasma gun further includes retaining means for retaining the segments and the insulating means in coaxial relationship the insulating means comprises a plurality of spacing rings formed of resilient material, each spacing ring being juxtaposed between adjacent segments for spacing the segments, the spacing ring being held in compression by the retaining means; and the insulating means further comprises a plurality of ceramic barrier rings each being 3uxtaposed between adjacent segments radially inward of a corresponding spacing ring;

each slot being bounded outwardly by the corresponding barrier ring;

a space being formed between adjacent segments with the barrier ring having a width sufficiently less than the space to compensate for thermal expansion of the segments and sufficiently large to block the spacing means from radiation from the arc; and the spacing ring adjacent the forward segment having a radially inward surface with a first step therein, and the corresponding barrier ring having a radially outward surface with a second step therein meshed with the first step so as to provide a path length sufficient to resist electrical breakdown between the adjacent segments in the presence of a high frequency starting voltage.

25. A method for generating a precision controlled plasma in a plasma gun having a hollow cylindrical anode member, a hollow cylindrical intermediate member formed of electrically conducting material electrically isolated from and juxtaposed coaxially with the anode member to form a plasma-forming gas passage through the intermediate member and the anode member, an axially movable rod-shaed cathode member having an anterior cathode tip and being located generally in the plasma-forming gas passage coaxially in spaced relationship with the anode member operable to maintain a plasma generating arc between the cathode tip and the anode member, priamry gas means including a primary gas inlet for introducing plasma-forming gas into the plasma-forming gas passage rearwardly of the cathode tip, and secondary gas means for introducing plasma-forming gas into the plasma-forming gas passage at a location proximate the anode member, the intermediate member being formed of a plurality of electrically conductive tubular segments and insulating means or spacing the segments, the segments being juxtaposed coaxially and held electrically isolated form each other by the insulating means, and the intermediate member being formed substantially with an absence of additional gas introduction into the plasma-forming gas passage, the method comprising:

introducing primary plasma-forming gas into the plasma-forming gas passage rearwardly of the cathode tip, introducing secondary plasma-forming gas into the plasma-forming gas passage at a location proximate the anode member, applying an arc voltage between the anode member and the cathode member to generate an arc therebetween, measuring the actual arc voltage and comparing the same with a predetermined arc voltage, and continually adjusting the axial position of the cathode tip relative to the anode member so as to maintain the actual arc voltage substantially equal to the predetermined arc voltage.

26. A method according to claim 25 further comprising, in sequence, positioning the cathode tip sufficiently close to the anode member for the arc to be initiated in the presence of a high frequency starting voltage, applying the high frequency starting voltage between the cathode tip and the anode member, and retracting the cathode member after arc. initiation to position the cathode tip relative to the anode member so as to establish the predetermined arc voltage.

* * * * *

UNITED STATES PATENT AND TRADEMARK OFFICE
CERTIFICATE OF CORRECTION

PATENT NO. : 4,780,591

DATED : October 25, 1988

INVENTOR(S) : Thomas F. Bernecki, Kevin J. Varley, William P. Rusch, Janusz Wlodarczyk and John F. Klein It is certified that error appears in the above-identified patent and that said Letters Patent is hereby corrected as shown below:

In Column 6 Line 39; after "ring" change "14" to --104--.

In Column 6 Line 40; after "rim" change "14D" to --44D--.

In Column 7 Line 17; after "chamber" change "22" to --122--.

In Column 7 Line 31; after "valve" change "1" to --142--.

In Column 7 Line 33; before "and" change "1" to --122--.

In Column 7 Line 33; after "valve" change "14" to --144--.

In Column 8 Line 50; after "body" change "211" to --212--.

In Column 9 Line 51; after "duct" change "288" to --280--.

In Column 14 Line 61; after "absence" change "or" to --of--.

In Column 16 Line 17; before "voltage" change "aro" to --arc--.

Signed and Sealed this

Fourth Day of July, 1989

*Attest:*

DONALD J. QUIGG

*Attesting Officer*

*Commissioner of Patents and Trademarks*

UNITED STATES PATENT AND TRADEMARK OFFICE

CERTIFICATE OF CORRECTION

PATENT NO. : 4,780,591

DATED : Oct. 25, 1988

INVENTOR(S) : Thomas F. Bernecki, et al.

Figure 1B:
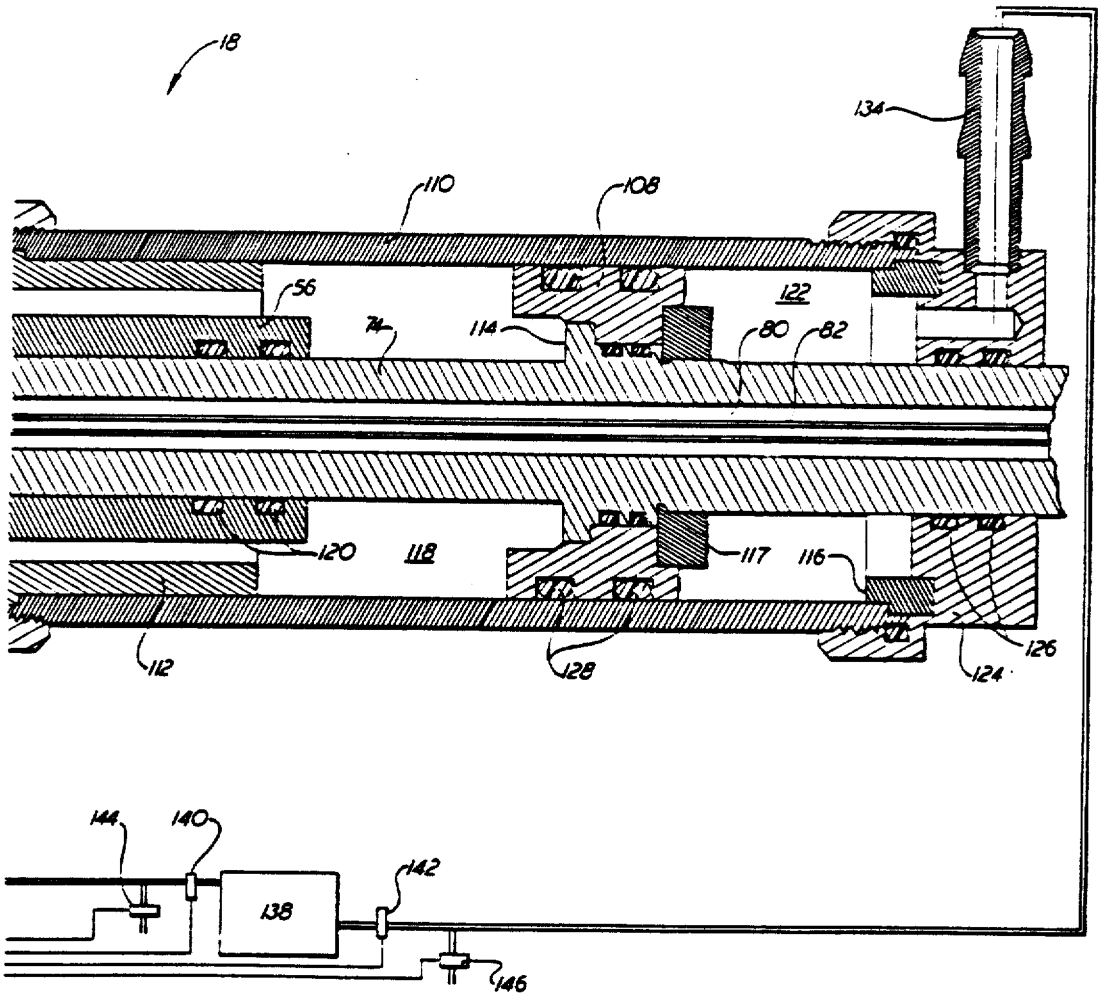
FIG. 1, comprising FIGS. 1(*a*) and 1(*b*) is a longitudinal sectional view of a plasma gun incorporating the present invention.

It is certified that error appears in the above-identified patent and that said Letters Patent is hereby corrected as shown below:

Add the sheet of drawing containing Fig. 1(b) as shown on the attached page.

Signed and Sealed this

Twenty-sixth Day of December, 1989

*Attest:*

JEFFREY M. SAMUELS

*Attesting Officer* *Acting Commissioner of Patents and Trademarks*